Figure 1:
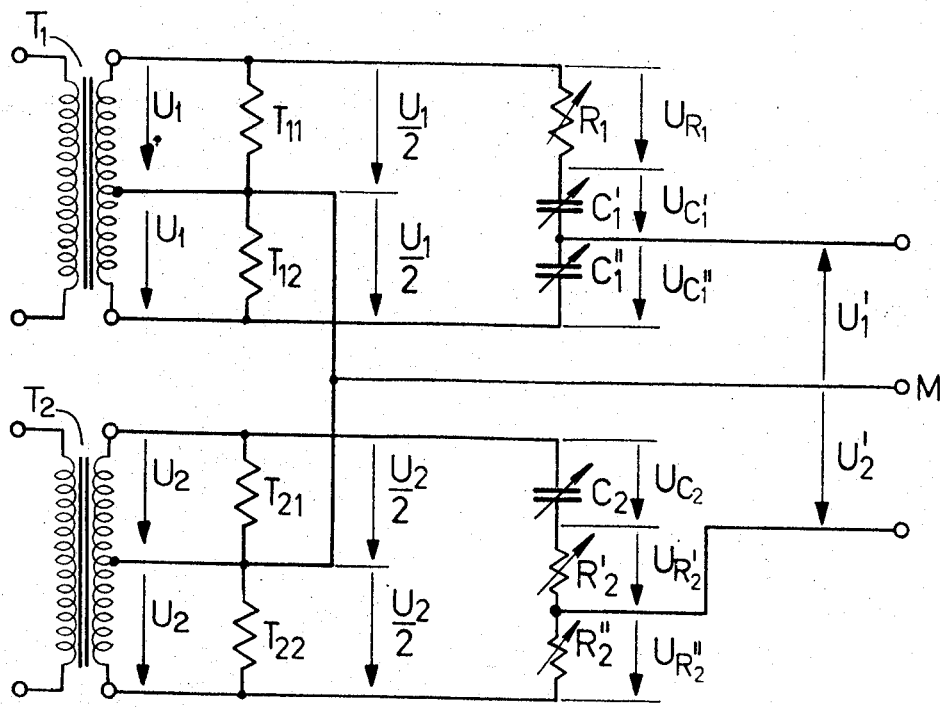

United States Patent
Narayan

[11] 3,775,668
[45] Nov. 27, 1973

[54] CIRCUIT ARRANGEMENT FOR PRODUCING TWO FREQUENCY INDEPENDENT MUTUALLY PHASE SHIFTED OUTPUT A.C. VOLTAGES FROM TWO INPUT A.C. VOLTAGES

[75] Inventor: Venkat Chellam Narayan, Spreitenback, Switzerland

[73] Assignee: Aktiengesellschaft Brown, Boveri & Cie, Baden, Switzerland

[22] Filed: June 12, 1972

[21] Appl. No.: 261,932

[30] Foreign Application Priority Data
June 15, 1971 Switzerland.......................... 8687/71

[52] U.S. Cl.............................. 323/122, 323/126
[51] Int. Cl........................ H03h 7/18, H03h 7/50
[58] Field of Search................... 307/262; 323/108, 323/109, 110, 111, 112, 120, 121, 122, 123, 323/124, 125, 126

[56] References Cited
UNITED STATES PATENTS
2,997,236 8/1961 Hammer......................... 323/125 X
2,968,759 1/1961 McKenney et al.............. 323/122 X
3,213,291 10/1965 Reid................................ 323/123 X
3,544,886 12/1970 Hou et al....................... 323/123 X FOREIGN PATENTS OR APPLICATIONS
605,259 7/1948 Great Britain...................... 323/124

Primary Examiner—A. D. Pellinen
Attorney—Ralph E. Parker et al.

[57] ABSTRACT

A circuit arrangement wherein two output a.c. voltages having a mutual phase shift are derived from two input a.c. voltages. The mutually phase shifted output voltages are frequency independent and two phase shifting units included in the circuit are comprised of resistances and of reactances of the same kind, one of the phase shift units including a series connected reactance, and two resistances having a tap therebetween forming one terminal of one of the output voltages, and the other phase shift unit including a series connected resistance and two reactances having a tap therebetween forming one terminal of the other output voltage. The second terminal of both output voltages is constituted by interconnected taps on voltage dividers connected to the two input voltages.

8 Claims, 2 Drawing Figures

CIRCUIT ARRANGEMENT FOR PRODUCING TWO FREQUENCY INDEPENDENT MUTUALLY PHASE SHIFTED OUTPUT A.C. VOLTAGES FROM TWO INPUT A.C. VOLTAGES

The present invention relates to a circuit arrangement with phase-shift elements, by means of which, from two input a.c. voltages, two output a.c. voltages can be produced which have a frequency-independent mutual phase shift.

In line protection techniques, frequently two a.c. voltages or currents are employed to detect and pinpoint a short-circuit. In this field in particular, it is frequently necessary to provide one of the two alternating quantities with an additional phase shift vis-a-vis the other, in order to achieve an optimum protective action.

In known circuits, one of the measuring circuits contains phase-shift elements in the form of resistors, capacitors or chokes. For example, in Brown Boveri Mitteilungen, 1962, No. 5, page 183, FIG. 19 thereof, a resistor is shown connected in series with the measuring coil CM2, and in association with the inductance of the latter produces the desired phase shift of 12°.

A major drawback of phase-shift elements of this kind, however, resides in the fact that the phase shift thus obtainable is closely dependent upon frequency.

Accordingly, networks have therefore become known in which, for example in the measuring circuit for each of the two input a.c. quantities, impedances are connected and in order to reduce the frequency-dependence, these impedances arranged to behave at the nominal frequency as conjugate complex impedances (see for example Austrian Pat. specification No. 176,903).

Conjugate complex impedances, however, consist in the simplest case of resistor and capacitor on the one hand and resistor and inductor on the other.

The drawback is that these circuits only provide an adequately frequency-independent phase shift within a narrow frequency range.

The object of the invention is to provide a circuit of the kind introductorily described which makes it possible to use impedances of the same kind, and which is distinguished by simple design and a very large degree of independence of frequency.

In accordance with the invention, this object is achieved in that one of the input a.c. voltages is applied to a first divider circuit and a first phase-shift unit; in that the other of the input a.c. voltages is applied to a second divider circuit and a second phase shift unit; in that the tapping points of the divider circuits are connected to one another and to an output terminal common to the output a.c. voltages; in that the first and second phase shift units consist of resistances and of reactances of the same kind; in that in the first phase shift unit the reactance is divided, so that between the division and the output terminal a first output a.c. voltage can be picked off; and in that in the second phase shift unit the resistance is divided, so that between the division and the output terminal a second output a.c. voltage can be picked off.

It is advisable to design the phase-shift units in such a fashion that the ratio of resistance to reactance is variable. In this fashion, the phase shift between the output a.c. voltages can be varied.

In accordance with a preferred embodiment of the invention, the first phase-shift unit contains a resistor and two capacitors, and the second unit a capacitor and two resistors.

In a further embodiment, the ratio between the capacitances of the two capacitors in the first phase-shift unit, is variable. This likewise enables the phase shift to be varied.

As an alternative to the foregoing, or in combination with it, the ratio between the resistances of the two resistors in the second phase-shift unit, can be made variable.

If the divider circuits in each case consist of two resistors, then this constitutes a simple design.

Advantageously, the divider circuits will in each case contain a transformer with a tapping. This provides conversion of high input a.c. voltages to suitable lower values, or vice-versa.

Figure 2:
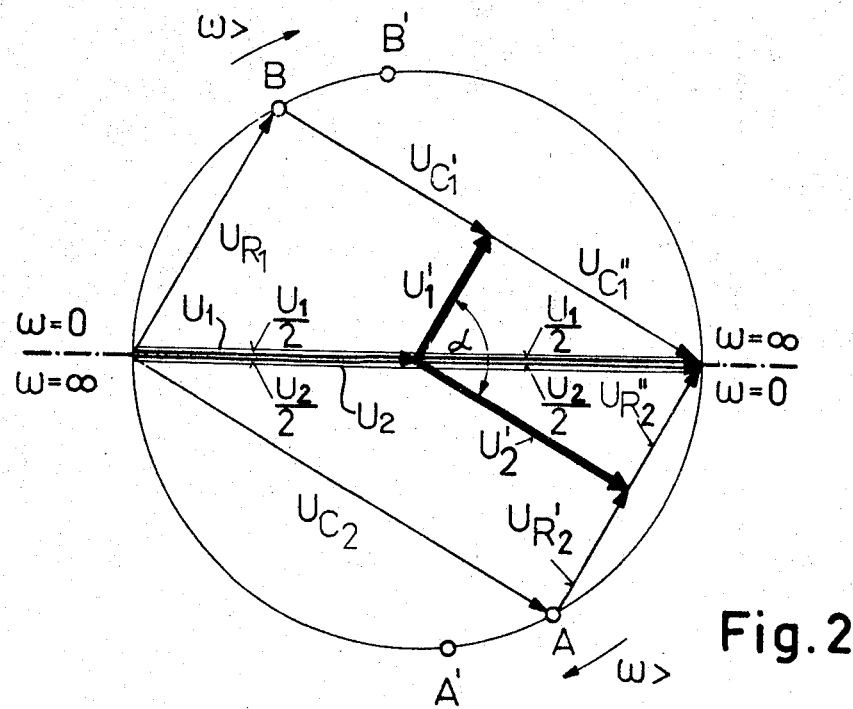

FIG. 1 is a schematic of a phase shifter embodying the principles of the invention, and FIG. 2 is a vector diagram illustrating the principles of the invention.

As shown in FIG. 1 an input a.c. voltage $U_1$ is applied from transformer $T_1$ in parallel to a divider circuit, consisting of two series-connected resistors $T_{11}$ and $T_{12}$, and to a phase-shift unit. The first phase-shift unit contains, in series, a resistor $R_1$ and two capacitors $C'_1$ and $C''_1$. Between the junction of these capacitors and the junction of the resistors $T_{11}$, $T_{12}$, a first output a.c. voltage $U'_1$ can be picked off.

The other input a.c. voltage $U_2$, is likewise applied from transformer $T_2$ to series-connected resistors $T_{21}$, $T_{22}$, and a second phase-shift unit. This latter contains, in series, a capacitor $C_2$ and two resistors $R'_2$ and $R''_2$. Between the junction of these resistors and the junction of the resistors $T_{21}$, $T_{22}$, a second output a.c. voltage $U'_2$ can be picked off.

The tapping points of the divider circuits are taken commonly to an output terminal M because the output a.c. voltages $U'_1$ and $U'_2$ are related to a common reference potential. The term "tapping" points is not meant to indicate that the input a.c. voltages are in each case split equally.

By means of the divider circuits, the input a.c. voltages are simply halved in this example, and this has been indicated by $U_1/2$ and $U_2/2$. The other voltage drops are indicated by the indices of the particular components.

The principle of the phase-shift circuit in accordance with the invention, is illustrated in FIG. 2.

The designations of the voltages as well as their reference directions, are evident from FIG. 1.

The geometric sum of $U_{R1} + U_{C1}' + U_{C1}''$ must be the same as the input a.c. voltage $U_1$ ($=(U_1/2 + (U_1/2)$. However, between the voltages $U_{C1}'$, $U_{C1}''$ on the one hand and $U_{R1}$ on the other, there is a phase difference of 90° so that one can make use of the "angle in a semicircle" construction. The top semicircle, struck above the line $U_1$, produces an infinite number of possible points which can be traversed by the corner B in the clockwise direction, with increasing radian frequency of the input a.c. voltage $U_1$.

At the radian frequency $\omega = 0$, there is no change in direction of $U_1$ so that the capacitors $C_1'$, $C_1'$ do not transfer their charges and $U_{R1}$ is likewise zero as a consequence. In the other extreme case $\omega = \infty$ (infinite), $U_{R1}$ will be equal to $U_1$.

The conditions are similar in the case of the second phase-shift unit.

Simply in order to better illustrate the relationships involved, $U_2$ ($= U_2/2 + U_2/2$) is aligned in the same direction as $U_1$, assumed to be equal in magnitude, and has been drawn in the same figure.

$U_{C_2}$ likewise lags $U_{R'_2}$ and $U_{R''_2}$ by 90° and the geometric sum is $U_2$. The corner A, with rising radian frequency, traverses an infinite number of possible points along the bottom semicircle, in the clockwise sense.

Between the output a.c. voltages $U'_1$ and $U'_2$ there is a phase shift $\alpha$ and this can be adjusted in the manner hereinbefore described. It will be assumed therefore, purely by way of example, that the ratio of the resistances or resistors $R'_2$ and $R''_2$, is altered. This results in a change in the direction of $U'_2$ so that if $U'_1$ stays unchanged, the phase shift $\alpha$ varies.

The essential thing, however, is that this phase shift is virtually frequency-independent; at $\alpha = 90°$, in fact, it is entirely frequency-independent.

By way of explanation, let one consider an increase in the radian frequency $\omega$ by an amount such that the original corners A, B, have displaced to A' and B'. The configuration of the voltage vectors which then results, has been omitted simply in order not to overburden the illustration. However, it will be clear that $U'_1$ and $U'_2$ will change their directions in the same direction of rotation so that their mutual phase shift remains practically unchanged.

In FIG. 2, a phase shift $\alpha$ of 90° has been shown. This is a value which is frequently required and furthermore has the advantage that it is completely independent of frequency.

In accordance with FIG. 2, $U_1$ and $U_2$ have been illustrated with the same magnitude and phase, although of course this has been done purely for the sake of simplicity. If, for example, one is concerned with two of the phase voltages of a three-phase system, then of course the actual phase shift between $U'_1$ and $U'_2$ is $120° + \alpha$, $\alpha$ being determined by the circuit arrangement in accordance with the invention and being adjustable between 0° and 180°.

If, instead of the capacitors shown in FIG. 1, inductors are used, the principle remains unchanged.

Although the input a.c. voltages have been shown halved in the drawing, this is by no means a condition. In fact, arbitrary division factors are possible.

If it is input alternating currents which are involved, then these can very easily be converted into input a.c. voltages, across a reistor.

I claim:

1. In a circuit arrangement for producing two output a.c. voltages having a mutual phase shift at least approximately independent of frequency from two input a.c. voltages, the combination comprising a first voltage divider and a first phase shift unit to which one of said input a.c. voltages is applied, a second voltage divider and a second phase shift unit to which the other input a.c. voltage is applied, respective tapping points on said first and second voltage dividers connected to each other and to an output terminal common to both of the output a.c. voltages to be produced, said first and second phase shift units each consisting of resistances and of reactances of the same kind, means providing a first tap between reactances of said first phase shift unit to establish one of said output a.c. voltages between said first tap and said common output terminal, and means providing a second tap between the resistances of said second phase shift unit to establish the other output a.c. voltage between said second tap and said common output terminal.

2. A circuit arrangement as defined in claim 1 for providing two frequency independent output a.c. voltages mutually shifted in phase wherein said first and second phase shift units are of such construction that the resistance-reactance ratio of each unit is variable.

3. A circuit arrangement as defined in claim 1 for providing two frequency independent output a.c. voltages mutually shifted in phase wherein said first phase shift unit includes a resistor and two capacitors between which said first tap is made, and wherein said second phase shift unit includes a capacitor and two resistances between which said second tap is made, said resistances and capacitors of said first and second phase shift units being respectively connected in series.

4. A circuit arrangement as defined in claim 3 for providing two frequency independent output a.c. voltages wherein the ratio of the capacitances of the two capacitors of said first phase shift unit is adjustable.

5. A circuit arrangement as defined in claim 3 for providing two frequency independent output a.c. voltages wherein the ratio of the resistances of the two resistors of said second phase shift unit is adjustable.

6. A circuit arrangement as defined in claim 1 for providing two frequency independent output a.c. voltages wherein said first and second voltage dividers are each constituted by resistors connected in series and between which said tapping points are made.

7. A circuit arrangement as defined in claim 1 for providing two frequency independent output a.c. voltages wherein said first and second voltage dividers each include a transformer having taps on the windings thereof.

8. In a circuit arrangement for producing two output a.c. voltages having a mutual phase shift at least approximately independent of frequency from two input a.c. voltages, the combination comprising a first voltage divider and a first phase shift unit to which one of said input a.c. voltages is applied, a second voltage divider and a second phase shift unit to which the other input a.c. voltage is applied, respective tapping points on said first and second voltage dividers connected to each other and to an output terminal common to both of the output a.c. voltages to be produced, said first and second phase shift units each consisting of resistances and reactances of the same kind, means providing a first tap between reactances of said first phase shift unit to establish one of said output a.c. voltages between said first tap and said common output terminal, and means providing a second tap between the resistances of said second phase unit to establish the other output a.c. voltage between said second tap and said common output terminal, said reactances of said first phase shift unit and said resistances of said second phase shift unit being divided by said first and second tapping respectively in such a ratio as to produce a phase shift of substantially 90° between said first and second output a.c. voltages.

* * * * *